US006529454B1

(12) United States Patent
Asoma et al.

(10) Patent No.: US 6,529,454 B1
(45) Date of Patent: Mar. 4, 2003

(54) INTEGRATED OPTICAL COMPONENT, OPTICAL PICKUP, AND OPTICAL DISC DEVICE

(75) Inventors: Yoshito Asoma, Saitama (JP); Kiyoshi Toyota, Tokyo (JP); Noriaki Nishi, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/508,169

(22) PCT Filed: Jul. 7, 1999

(86) PCT No.: PCT/JP99/03677

§ 371 (c)(1), (2), (4) Date: Mar. 8, 2000

(87) PCT Pub. No.: WO00/03390

PCT Pub. Date: Jan. 20, 2000

(30) Foreign Application Priority Data

Jul. 9, 1998 (JP) .......................................... 10-194288

(51) Int. Cl.$^{7}$ ................................................ G11B 7/00

(52) U.S. Cl. ............................... 369/44.12; 369/44.23; 369/112.28

(58) Field of Search .......................... 369/44.12, 44.23, 369/112.28, 112.29, 112.21, 112.14, 110.02, 110.04, 109.02, 112.17, 112.18, 112.19

(56) References Cited

U.S. PATENT DOCUMENTS 5,708,644 A * 1/1998 Hasegawa .............. 369/112.19
5,790,504 A * 8/1998 Hayashi et al. .......... 369/44.23
6,192,020 B1 * 2/2001 Takasuka et al. ........ 369/44.12
6,254,284 B1 * 7/2001 Yoshimoto et al. ...... 369/44.12

FOREIGN PATENT DOCUMENTS

DE 196 42 346 A1 * 9/1997
JP 61-198456 9/1986
JP 63-167431 7/1988
JP 6-176426 6/1994
JP 8-36781 A 2/1996
JP 9-231604 A 9/1997

* cited by examiner

*Primary Examiner*—Thang V. Tran
(74) *Attorney, Agent, or Firm*—Rader, Fishman & Grauer PLLC; Ronald P. Kananen, Esq.

(57) ABSTRACT

A cylindrical lens 39 for generating focussing error signals is formed as one with a portion of an optical component 33 of a transparent material lying on an optical path L2 that is an optical path of a return light beam from the optical member 33. This configuration assures a small size while reducing the production cost and improving operational reliability.

27 Claims, 7 Drawing Sheets

34
30
40a
40
41
42
42a
38
39
33a
33
L1
L2
31
32a
36a
33b
32
35
37
36

INTEGRATED OPTICAL COMPONENT, OPTICAL PICKUP, AND OPTICAL DISC DEVICE

TECHNICAL FIELD

This invention relates to an integrated optical component, used in an optical pickup for recording and/or reproducing signals for an optical disc, such as a magneto-optical disc, an optical pickup device employing this integrated optical component and an optical disc device provided with the optical pickup device.

BACKGROUND ART

Up to now, an optical pickup for a magneto-optical disc, constructed as shown in FIG. 1, has been put to practical use.

An optical pickup 1, shown in FIG. 1, is constructed as an optical pickup for e.g., a mini-disc (MD), and includes an astigmatism correcting plate 3*a*, a grating 3*b*, a beam splitter 4, a collimator lens 5, a optical path raising mirror 6 and an objective lens 7, arranged in this order in an optical path of a light beam radiated from a semiconductor laser element 2 as a light source and proceeding towards an optical disc D, and a Wollaston prism 8*a*, a multi-lens 8*b* and a photodetector 9, arranged in this order in the optical path of the return light from the optical disc D separated by a separator film 4*a* of the beam splitter 4, these optical components being mounted separately from one another.

In the optical pickup 1, constructed as described above, the light beam radiated from the semiconductor laser element 2 is corrected for astigmatism by the astigmatism correcting plate 3*a* and subsequently split by the grating 3*b* into three light beams, namely a main beam and two side beams, which are respectively incident on the beam splitter 4.

A portion of the light beam incident on the beam splitter 4 is transmitted through the separator film 4*a* of the beam splitter and is turned into a collimated beam by the collimator lens 5. The collimated light beam then has its optical path warped by the optical path raising mirror 6 and is converged by the objective lens 7 so as to be illuminated on a signal recording surface of the optical disc D. At this time, three spots are formed on the signal recording surface of the optical disc D by the respective light beams split by the grating 3*b*.

When the light beam illuminated on the signal recording surface of the optical disc D is reflected by the signal recording surface of the optical disc D, it has its polarization plane rotated, under the magnetic Kerr effect, depending on the state of magnetization (recording state) of a portion of the signal recording surface irradiated with the light beam.

The return light beam, reflected by the signal recording surface of the optical disc D, again falls on the beam splitter 4 via the objective lens 7, optical path raising mirror 6 and collimator lens 5.

Another portion of the light beam incident on the beam splitter 4 is reflected by the separator film 4*a* of the beam splitter 4 to fall on the Wollaston prism 8*a*.

The Wollaston prism 8*a* is made up of two uniaxial crystals, bonded together, and separates the incident light into three light beams, namely a p-polarized light beam, an s-polarized light beam and a p+s polarized light beam (direction of polarization relative to the separator film 4*a* of the beam splitter 4), having respective different reflection angles, based on the difference in the orientation on the junction surface of the optical axes of the two uniaxial crystals. The return light, falling on the Wollaston prism 8*a*, is split into the three light beams by the Wollaston prism 8*a*, afforded with astigmatism and extended in optical path length by the multi-lens 8*b* and is received by the light receiving surface of the photodetector 9 for signal detection.

Of the return light, received by the light receiving surface of the photodetector 9, the p-polarized light and the s-polarized light, obtained on splitting by the Wollaston prism 8*a*, is used as basis to detect the magneto-optical signals. That is, the return light, obtained on reflection on the signal recording surface of the optical disc D with rotation of the plane of polarization and on separation by the Wollaston prism 8*a* into the p-polarized light and the s-polarized light, is received by the light receiving surface of the photodetector 9, whereby the state of magnetization on the signal recording surface of the optical disc D (recording state) is detected as changes in light intensity.

On the other hand, of the return light, received by the light receiving surface of the photodetector 9, the p+s polarized light, separated by the Wollaston prism 8*a* and afforded with the astigmatism by the multi-lens 8*b*, is used as basis to detect focussing error signals by the so-called astigmatic method. Also, of the return light, received by the light receiving surface of the photodetector 9, the two side beams, as split by the above-mentioned grating 3*b*, are used as basis to detect tracking error signals by the so-called three-spot method.

In the present optical pickup 1, the objective lens 7 is adapted to perform fine movements, based on pre-set servo signals, so that the light beam from the semiconductor laser element 2 will form a spot at a correct position on the signal recording surface of the optical disc D to reproduce correct recording signals, in order to detect correct magneto-optical signals.

That is, the so-called tracking servo of causing fine movements of the objective lens 7 along the radius of the optical disc D is effected based on the above-mentioned tracking error signals, in order for the spot of the light beam to follow the recording track of the optical disc D. On the other hand, the so-called focussing servo of causing fine movements of the objective lens 7 along the optical axis towards and away from the signal recording surface of the optical disc D is effected based on the above-mentioned focussing error signals so that the light beam will form a correct spot on the signal recording surface of the optical disc D.

Meanwhile, in the optical pickup 1, constructed as described above, the recording information written on the optical disc D is read out by plural separately mounted optical components, such that the optical pickup cannot be reduced in size or in the number of the components, thus complicating the assembling steps or the optical adjustment steps of the optical pickup to raise the production cost.

On the other hand, in the replay-only optical pickup, adapted for reading out the recording information from e.g., a compact disc (CD), an integrated optical component, obtained on integration of the semiconductor laser element as a light source and a photodetector etc, is used to reduce the size of the optical pickup and that of the optical disc device having the optical pickup built-in therein.

Meanwhile, the conventional integrated optical component, employing a non-polarization optical system as an optical system, is highly effective for use on a replay-only optical pickup. However, if the integrated optical component is to be applied to an optical pickup adapted for recording and/or reproducing a magneto-optical disc, the following problem arises.

That is, if such integrated optical component is used in an optical pickup for recording and/or reproduction of a magneto-optical disc, only the focussing error signals, not dependent on the direction of polarization, need to be detected by the light receiving element of the integrated optical component, whereas the magneto-optical signals and tracking error signals, dependent on the direction of polarization, need to be detected by a photodetector provided independently of the integrated optical component. The result is that, in this optical pickup, not only can the number of component parts not be reduced sufficiently, but detection signals are respectively detected from the two optical components, that is the integrated optical component and the photodetector, thus increasing the number of lead lines for signal lead-out and complicating the assembling operation to raise the mounting cost.

Moreover, since the polarization splitting means, such as Wollaston prisms, or cylindrical lenses for detecting the focussing error signals, as astigmatism affording means, are required for detecting the magneto-optical signals from the return light from the optical disc for the photodetector, the number of external components is increased to raise the costs for component parts and for assembling in a manner not favorable in reducing the size or improving the operational reliability.

DISCLOSURE OF THE INVENTION

In view of the above-described status of the art, it is an object of the present invention to provide an integrated optical component that is able to realize size reduction of the optical pickup and cost reduction and to improve the operational reliability, an optical pickup employing this integrated optical component and an optical disc device provided with this optical pickup.

An integrated optical component according to the present invention includes an integrated optical component used for an optical pickup configured for illuminating a light beam on a signal recording surface of an optical disc to record and/or reproduce signals, including a light source for radiating a light beam for illuminating a signal recording surface of the optical disc, a photodetector for receiving the return light beam reflected back from the signal recording surface of the optical disc, a package member having an opening in one major surfaces thereof and configured for accommodating the light source and the photodetector therein, an optical component provided on the major surface of the package member having the opening, the optical component being configured to transmit the light beam radiated from the light source therethrough and to transmit the return light beam proceeding towards the photodetector and light separating means provided as-one with the optical component and configured for separating the light beam radiated from the light source from the return light beam proceeding towards the photodetector. The optical component is formed as-one with focussing error signal generating means positioned on an optical path of the return light beam separated by the light separating means to proceed towards the photodetector.

In this integrated optical component, the light beam radiated from the light source is incident on and transmitted through the optical component via an opening in the package member so as to be fall on the light separating means. The return light beam separated from the light separating means then is incident on and transmitted through the optical component. At this time, the return light beam is transmitted through focussing error signal means formed as-one with the optical component. This focussing error signal generating means is used for generating focussing error signals and is comprised of, for example, a cylindrical lens or a Foucault prism.

The return light beam, transmitted through the focussing error signal generating means and through the optical component, falls on the package member via opening so as to be received by the photodetector. The playback signals and the focussing error signals etc are generated based on detection signals from the light receiving sections of the photodetector.

In this integrated optical component, the respective optical components are integrated and unified, while the focussing error signal generating means are formed as-one with the optical components, thus reducing the overall size and the number of the components.

Also, in this integrated optical component, since the light source and the photodetector are formed as a sole integral unit which is provided on, for example, a sole substrate, it is possible to reduce the number of leads used to lead out signals, to simplify the assembling operation and to reduce the assembling cost, while position registration of the light source and the photodetector may be dispensed with.

In the integrated optical components of the present invention, light splitting means for splitting the light beam into plural beams is preferably formed as one with the optical component and positioned on the optical path of a light beam radiated from the light source to proceed towards the light splitting means.

The light splitting means is comprised of a diffraction grating for splitting the light beam radiated from the light source into a main beam which is at least the zero-order light and two side beams of ± order one light. The two side beams, as split by the light splitting means, are used for generating tracking error signals.

In the present integrated optical component, in which the light splitting means is formed as-one with the optical component, the number of components can be reduced further.

In the integrated optical component according to the present invention, the light splitting means preferably includes a first separating film for separating the light beam radiated from the light source and the return light beam proceeding towards the photodetector, and a reflecting surface for reflecting the return light beam separated from the first separating film. The first optical path, as an optical path of the light beam proceeding towards the first separation film, is preferably substantially parallel to the second optical path, as an optical path of the return light beam reflected back from the reflecting surface.

With the integrated optical component, in which the first and second optical paths are substantially parallel to each other, the light source can be positioned in proximity to the photodetector, thus further reducing the overall size.

Also, with the integrated optical component according to the present invention, the first separating film of the light separating means is preferably a partial polarization separating film having differential transmittance depending on the direction of polarization of the incident light.

With the integrated optical component, in which the first separating film of the light separating means is formed as a partial polarization separating film having differential transmittance depending on the direction of polarization of the incident light, an enhancing effect for the so-called Kerr enhancement effect may be endowed. The Kerr rotation angle enhancing effect is the effect of increasing the rotational angle of the polarization plane of the return light beam incident on the light separating means.

In the integrated optical component according to the present invention, the light separating means preferably has polarization splitting means between the first separating film and the reflecting surface for polarization-splitting the return light beam from the signal recording surface of the optical disc as separated by the first separating film.

With the integrated optical component, in which the light splitting means includes polarization splitting means for polarization-splitting the return light beam. The plural return light beams, polarization-split by the polarization splitting means, are received by the photodetector for detecting the magneto-optical signals as playback signals.

Also, in the integrated optical component according to the present invention, the first separating film, the polarization splitting means and the member having the reflecting surface are preferably formed as-one with one another, In the integrated optical component, in which the first separating film, the polarization splitting means and the member having the reflecting surface are formed as-one with one another, whereby the integrated optical component can be reduced further in size and the number of component parts can be further diminished to lower the costs incurred in component parts and in assembling further.

Also, in the integrated optical component according to the present invention, light beam adjustment means is preferably formed as one with the optical component on the optical path of the light beam radiated from the light source to proceed towards the light splitting means for converting the angle of divergence of the light beam radiated from the light source.

In the integrated optical component, provided with light beam adjustment means for converting the angle of divergence of the light beam radiated from the light source, the light beam radiated from the light source is passed through the light beam adjustment means and thereby converged to some extent, so as to be then guided to the light beam converging means of the optical pickup, whereby an objective lens of a finite multiplication factor, for example, may be used as light converging means. Thus, in the optical pickup, employing this integrated optical component, the optical component converting the light beam into a collimated light beam, such as a collimator lens, may be dispensed with to further reduce the overall size or the number of the components, thus further reducing the cost in the components or in assembling operations.

Also, with the present integrated optical component, the above-described light beam adjustment means is formed as-one with the optical component, whereby it is possible to reduce the size further and the number of component parts to further reduce the costs incurred in component parts and in assembling.

Also, in the integrated optical component, the above-described objective lens adjustment means preferably has differential conversion factors for the tangential and radial directions.

In the integrated optical component, in which the objective lens adjustment means preferably has differential conversion factors for the tangential and radial directions, it is possible for the light beam adjustment means to have the function of correcting the astigmatism of the light beam which is radiated from the light source so as to be illuminated on the optical disc. Thus, in the present integrated optical component, there is no necessity of providing separate astigmatism correcting plate, thus realizing further size reduction and reduction in the number of components to reduce the costs incurred in components and in assembling operations.

An optical pickup for illuminating a light beam towards a signal recording surface of an optical disc for recording and/or reproducing signals, according to the present invention, includes an integrated optical component, and light converging means for converging the light beam for illuminating the converged light beam on the signal recording surface of the optical disc. The integrated optical component includes a light source for radiating a light beam for illuminating a signal recording surface of the optical disc, a photodetector for receiving the return light beam reflected back from the signal recording surface of the optical disc, a package member having an opening in one major surfaces thereof and configured for accommodating the light source and the photodetector therein, an optical component provided on the major surface of the package member having the opening, and light separating means provided as-one with the optical component and which is configured for separating the light beam radiated from the light source from the return light beam proceeding towards the photodetector. The optical component is configured to transmit the light beam radiated from the light source therethrough and to transmit the return light beam proceeding towards the photodetector therethrough. The optical component is formed as-one with focussing error signal generating means positioned on an optical path of the return light beam separated by the light separating means to proceed towards the photodetector.

In this optical pickup, the light beam radiated from the light source of the integrated optical component falls on the optical component via the opening in the package member so as to be transmitted through the optical component to fall on the light splitting means. The light beam transmitted through the light separating means then is radiated from the integrated optical component.

The light beam, thus radiated from the signal recording surface of the optical disc, is converged by the light converging means so as to be illuminated on the signal recording surface of the optical disc.

The return light beam radiated from the signal recording surface of the optical disc is re-transmitted through the light beam converging means to fall on the light splitting means of the integrated optical component. The return light beam incident on the light separating means is thereby separated from the return light beam proceeding towards the optical disc. The return light beam, separated by the light separating means, is incident on and transmitting through the optical component. At this time, the return light beam traverses focussing error signal means formed as-one with the optical component. This focussing error signal means is used for generating focussing error signals and is made up of, for example, a cylindrical lens or a Foucault prism.

The return light beam, traversing the focussing error signal means and transmitting through the optical component, falls on the package member via the opening so as to be received by the photodetector. Based on the detection signals from the light receiving sections of the photodetector, the playback signals or the focussing error signals etc are generated.

In the present optical pickup, the integrated optical component is constructed by integrating and unifying the focussing error signal generating means with the optical component, the overall size and also the number of components may be reduced.

Also, in the present optical pickup, the light source and the photodetector of the integrated optical component are constructed as a sole integral unit, mounted on e.g., a sole substrate, it is possible to reduce the number of leads for signal lead-out and the assembling cost as well as to simplify the assembling operations. Moreover, the position registration between the light source and the photodetector may be dispensed with.

In the optical pickup according to the present invention, there is preferably provided between the integrated optical component and the light converging means a reflecting member for reflecting the light beam from the integrated optical component to cause the reflected light beam to proceed towards the light converging means, the reflecting member reflecting the return light transmitted through the light converging means to cause the reflected light to proceed towards the integrated optical component.

In the optical pickup, constructed as described above, the optical path from the integrated optical component to the reflecting member can be substantially collimated with respect to the signal recording surface of the optical disc, thus enabling the thickness to be reduced.

An optical disc device according to the present invention includes an optical pickup for illuminating a light beam on a signal recording surface of an optical disc to detect the return light from a signal recording surface of the optical disc, a biaxial actuator for supporting the light converging means provided on the optical pickup for movement in bi-axial directions, a signal processing circuit for generating playback signals based on a detection signal from a photodetector provided on the optical pickup and servo means for causing movement in the bi-axial directions of the light converging means provided in the optical pickup based on a detection signal from the photodetector provided on the optical pickup. The optical pickup includes a light source for radiating a light beam for illuminating a signal recording surface of the optical disc, a photodetector for receiving the return light beam reflected back from the signal recording surface of the optical disc, a package member having an opening in one major surfaces thereof and configured for accommodating the light source and the photodetector therein, an optical component provided on the major surface of the package member having the opening, the optical component being configured to transmit the light beam radiated from the light source therethrough and to transmit the return light beam proceeding towards the photodetector and light separating means provided as-one with the optical component and configured for separating the light beam radiated from the light source from the return light beam proceeding towards the photodetector. The optical component is formed as-one with focussing error signal generating means positioned on an optical path of the return light beam which is separated by the light separating means to proceed towards the photodetector.

In the present optical disc device, the light beam radiated from the light source of the integrated optical component is incident via the opening in the package member and transmitting through the optical component so as to be again incident on the light separating means. The light beam transmitted through the light separating means is radiated from the integrated optical component.

The light beam radiated from the integrated optical component is converged by the light converging means so as to be illuminated on the signal recording surface of the optical disc.

The return light beam, reflected from the signal recording surface of the optical disc, again traverses the light traversing means to fall on the light separating means of the integrated optical component. The return light beam, incident on the light separating means, is separated by the light separating means from the light beam proceeding towards the optical disc. The return light beam, thus separated by the light separating means, is incident on and transmitted through the optical component. At this time, the return light beam traverses the focussing error signal means formed as-one with the optical component. The focussing error signal means is adapted to generate the focussing error signals and is made up of, for example, a cylindrical lens or a Foucault prism.

The return light beam, traversing the focussing error signal means and transmitted through the optical component, is incident via the opening on the package member so as to be received by the photodetector.

In the present optical disc device, playback signals are generated in the signal processing circuit based on detection signals from the photodetector in the integrated optical component.

In the present optical disc device, focussing error signals and the tracking error signals are generated, based on a detection signal from the photodetector of the integrated optical component. Based on these focussing error signals and the tracking error signals, a biaxial actuator is driven by the servo means, so that the light converging means provided on the optical pickup is driven in a biaxial direction, that is in a direction along the radius of the optical disc or in a direction approaching to or receding away from the signal recording surface of the optical disc, by way of performing focussing servo and tracking servo operations.

In the present optical disc device, in which the respective optical components of the integrated optical component are integrated and unified to a sole unit, and in which the focussing error signal generating means are provided as-one with the optical component, the optical pickup and the optical disc device can be reduced in size, whilst the number of component parts may also be diminished.

Also, in the present optical disc device, in which the light source and the photodetector of the integrated optical component are integrated and unified to a sole unit, which is provided on e.g., a sole substrate, it is possible to reduce the number of leads for signal lead-out and the assembling cost as well as to simplify the assembling operations. Moreover, the position registration between the light source and the photodetector may be dispensed with.

BEST MODE FOR CARRYING OUT THE INVENTION

Figure 1:
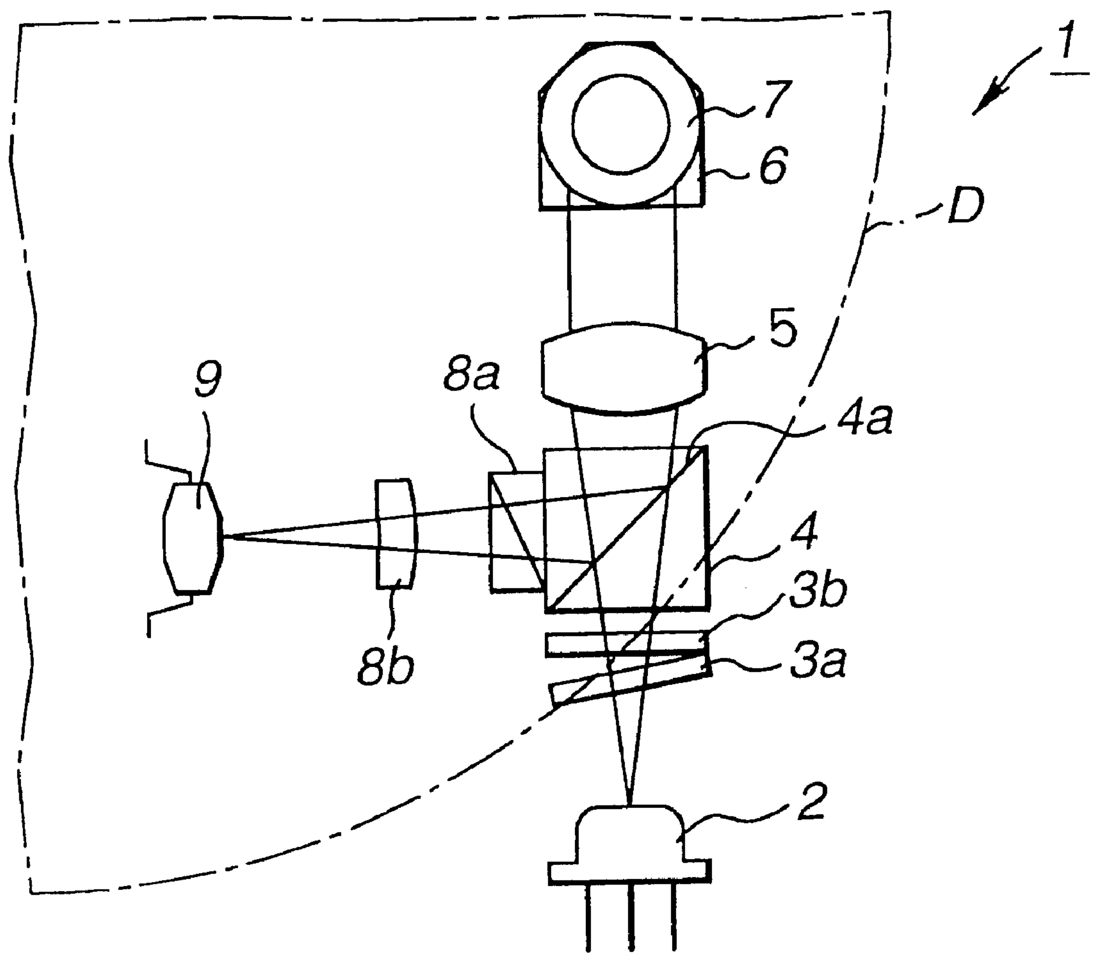
FIG. 1 is a schematic plan view showing an illustrative structure of a conventional optical pickup.

The best mode for carrying out the present invention is hereinafter explained by referring to the drawings.

FIRST EMBODIMENT

Figure 2:
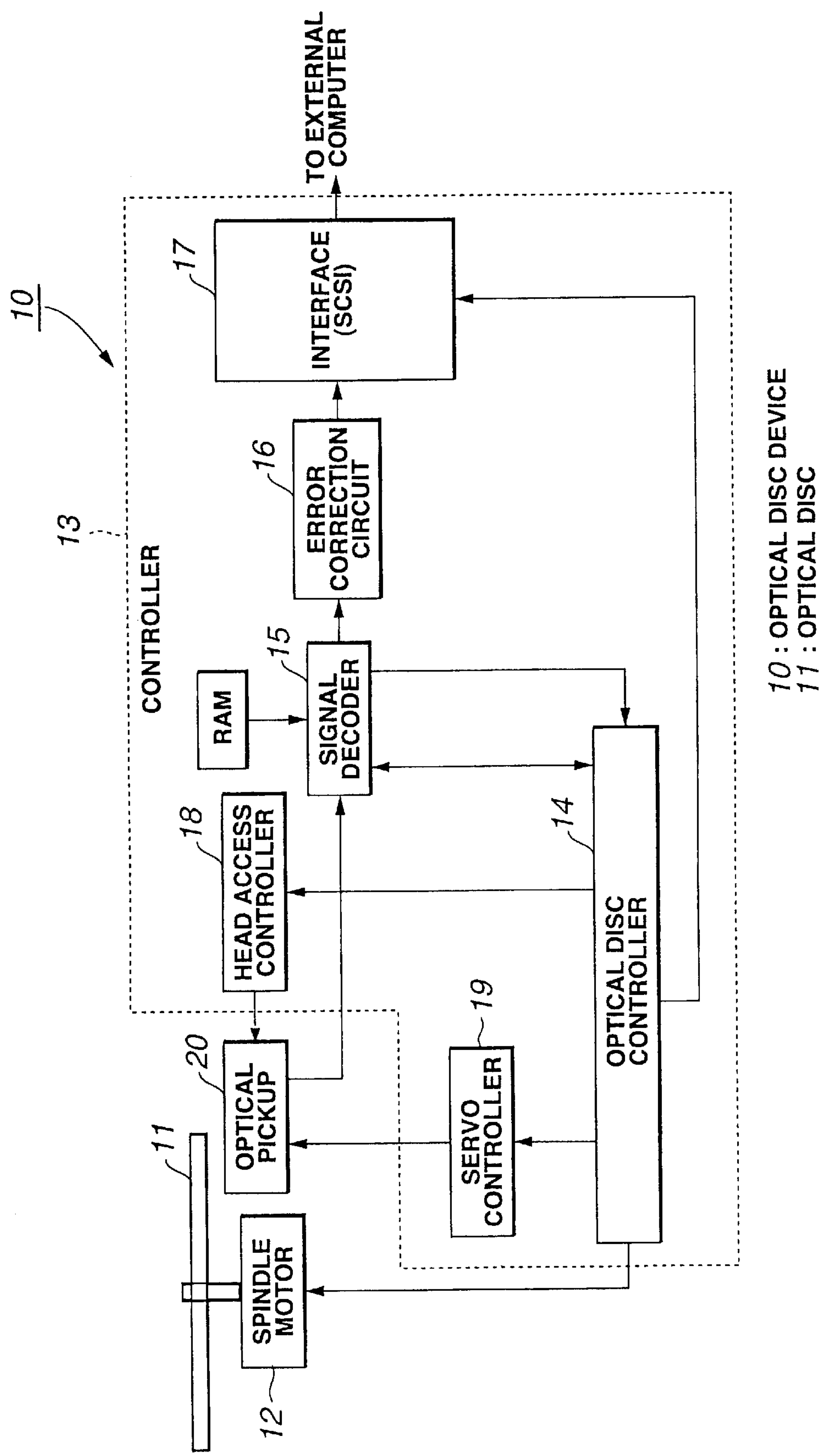
FIG. 2 is a block diagram showing an illustrative structure of an optical disc device according to the present invention.

FIG. 2 shows an overall structure of an optical disc device 10 embodying the present invention. Referring to FIG. 2, the optical disc device 10 includes a spindle motor 12, as driving means for rotationally driving an optical disc 11, such as a magneto-optical disc, an optical pickup 20 and a controller 13 for controlling the spindle motor 12 and the optical pickup 20. The optical pickup 20 illuminates a light beam on a signal recording surface of the optical disc 11, run in rotation by the spindle motor 12, to receive the return light beam reflected back from the signal recording surface of the optical disc 11 to read out the recording signal recorded on the signal recording surface of the optical disc 11.

The controller 13 includes an optical disc controller 14, a signal demodulator 15, an error correction circuit 16, an interface 17, a head accessing controller 18 and a servo controller 19.

The optical disc controller 14 rotationally drives the spindle motor 12 at a preset rpm, while controlling the operation of various components in the controller 13.

The signal demodulator 15 and the error correction circuit 16 demodulates recording signals read out from the optical disc 11 and corrects the demodulated recording signals for errors to route the resulting signals via interface 17 to an external computer. This permits the external computer to receive the signals recorded on the optical disc 11 as playback signals.

The head accessing controller 18 causes movement of the optical pickup 20 by e.g., track jump to a pre-set recording track on the signal recording surface of the optical disc 11, under control by the optical disc controller 14.

The servo controller 19 causes movement of the objective lens, held by a biaxial actuator of the optical pickup 20, at a position to which it has been moved as described above, in two axial directions, namely in a direction towards and away from the signal recording surface of the optical disc 11 (focussing direction) and in a direction along the radius of the optical disc 11, under control by the optical disc controller 14, by way of performing focussing servo and tracking servo operations.

Figure 3:
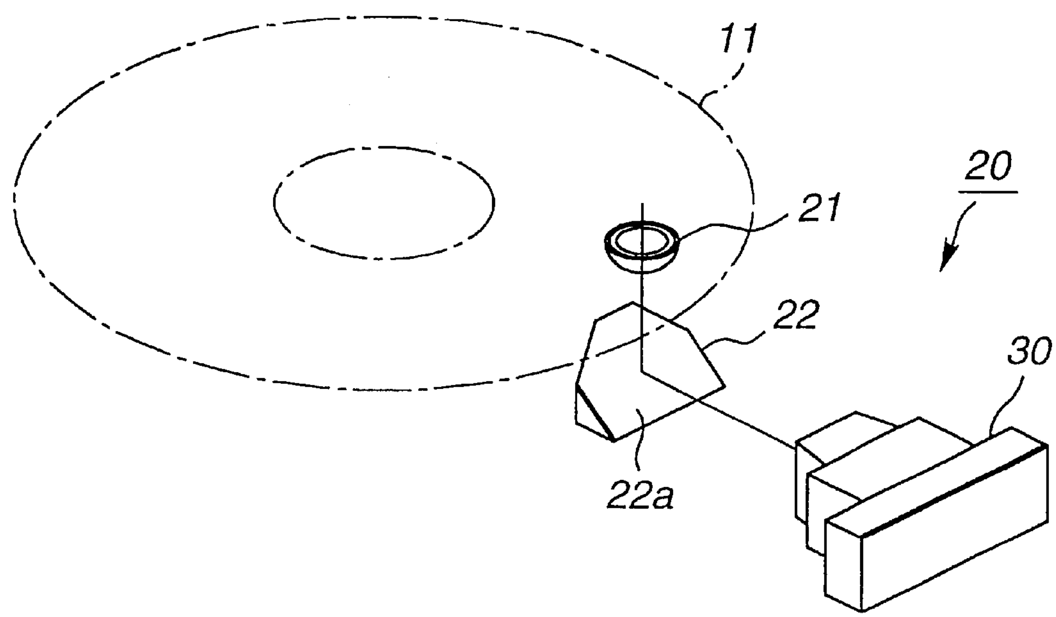
FIG. 3 is a schematic perspective view an illustrative structure of an optical pickup provided in the optical disc device.

Referring to FIG. 3, the optical pickup 20 includes an integrated optical component 30, comprised of plural optical components, inclusive of a light source and a photodetector, and an objective lens 21 for converging the light beam radiated from the integrated optical component 30 for illuminating the converged light beam on the signal recording surface of the optical disc 11. The optical pickup 20 also includes an optical path raising mirror 22 for warping the optical path of the light beam radiated from the integrated optical component 30 to guide it to the objective lens 21 and for warping the optical path of the return light beam reflected back by the signal recording surface of the optical disc 11 to guide it to the integrated optical component 30.

Figure 4:
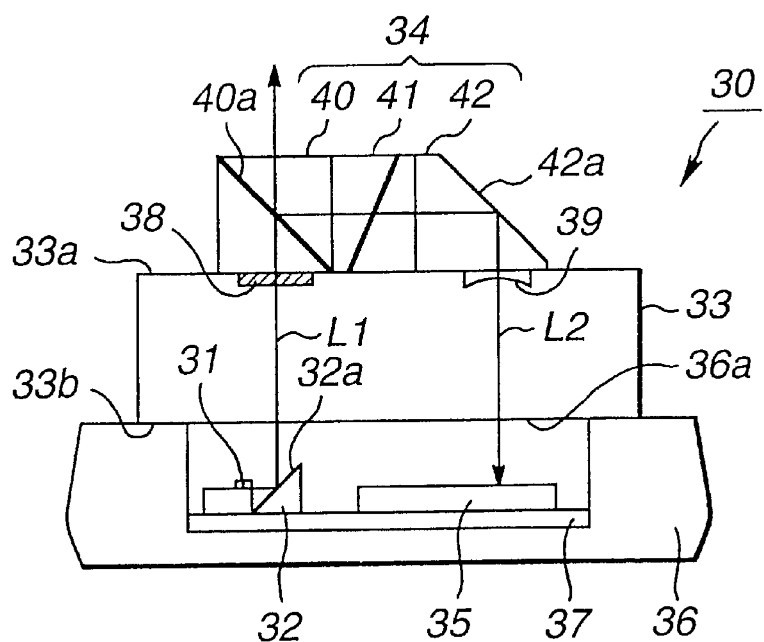
FIG. 4 is a schematic view showing an illustrative integrated optical component provided in the optical pickup of FIG. 3.

Referring to FIG. 4, the integrated optical component 30 includes a semiconductor laser element 31, as a light source, a triangular prism 32, having the function of warping the optical path of the light beam radiated from the semiconductor laser element 31, and an optical element 33 of a transparent material, designed to transmit the laser light, the optical path of which has been warped by the triangular prism 32 therethrough, and to transmit a return light beam reflected back from the signal recording surface of the optical disc 11 therethrough. The integrated optical component 30 also includes a composite prism 34, as light separating means having the function of separating the light beam proceeding towards the optical disc 11 and the return light beam reflected back by the signal recording surface of the optical disc 11, and a photodetector IC 35, as a photodetector for receiving the return light beam.

The semiconductor laser element 31, triangular prism 32 and the photodetector IC 35 are provided on a substrate 37 arranged in a resin package 36. The resin package 36 has an opening 36*a* in its major surface. An optical member 33 is bonded, such as with an adhesive, to the major surface of the resin package 36 formed with the opening 36, in a manner of closing the opening 36. On the optical member 33, a composite prism 34 is bonded with e.g., an adhesive. That is, the integrated optical component 30 is formed as a unitary device comprised of the above-mentioned integrated components. The integrated optical component 30 is secured to an optical base member, supported for movement along the radius of the optical disc 11 along a guide shaft, not shown.

The semiconductor laser element 31 is a light emitting element, exploiting the recombination radiation of a semiconductor, and radiates the laser light (light beam) to be illuminated on a signal recording surface of the optical disc 11.

The triangular prism 32 includes an inclined surface (reflecting surface 32*a*) which is inclined at an angle of approximately 45° relative to the substrate 37. This reflecting surface 32*a* reflects the light beam radiated from the semiconductor laser element 31 towards the substrate 37 substantially parallel thereto to warp its optical path by approximately 90°.

The optical member 33 is molded of, for example, a transparent plastics or glass material in a plan-parallel plate. The optical member 33 is formed as one with a grating 38, as light splitting means, located on a optical path of the light beam reflected back from the triangular prism 32 towards the composite prism 34. This optical path is referred to below as a first optical path L1. The optical member 33 is also formed as one with a cylindrical lens 39, as focussing error signal generating means, provided on an optical path of a return light beam which is separated by the composite prism 34 to proceed towards the photodetector IC 35. This optical path is referred to below as second optical path L2.

In the optical pickup 20, in which the grating 38 as light splitting means and the cylindrical lens 39 as focussing error signal generating means are formed as one with the optical member 33 of the integrated optical component 30, there is no necessity of providing light splitting means and focussing error signal generating means as separate optical components. Thus, in this optical pickup 20, the number of component parts is decreased by the light splitting means and the focussing error signal generating means not being provided as separate optical components, thus realizing corresponding reduction in the size of the device. Moreover, there is no necessity of registration of the light splitting means or the focussing error signal generating means when assembling the optical pickup 20, thus simplifying the assembling operation.

The grating 38 is a diffraction lattice for diffracting the incident light mounted at a portion of an upper surface 33*a* of the optical member 33 traversed by the light beam, that is a surface to which is bonded the composite prism 34, i.e., on the first optical path L1. This grating 38 splits the light beam, transmitted through the optical member 33 via the first optical path L1, into at least three light beams, namely a main beam, composed of a order zero diffracted light, and two side beams, composed of ± order one diffracted light. With the optical pickup 20, having this grating 38, tracking error signals can be detected by a three-spot method by splitting the light beam into at least three beams.

Meanwhile, the grating 38, as this light splitting means, may also be mounted on a lower surface 33*b* of the optical member 33 (surface to which is bonded the resin package 36).

It is only necessary for the light splitting means to have the function of splitting the light beam radiated from the semiconductor laser element 31 into at least three light beams, namely the main beam and the two side beams. Thus, the light splitting means may be constituted by a hologram formed on the surface of the optical member 33.

The cylindrical lens 39 affords astigmatism to the incident light, while adjusting the optical path length. For example, the cylindrical lens 39 is mounted at a portion of the upper surface 33*a* of the optical member 33 traversed by the return light beam, that is on the second optical path L2. This cylindrical lens 39 affords astigmatism to the return light beam separated by the composite prism 34 to traverse the optical member 33 through the second optical path L2 in order to enable the focussing error signals to be detected by the so-called focussing error signals.

Meanwhile, the cylindrical lens 39, as the focussing error signal generating means, may be mounted on the lower surface 33*b* of the optical member 33.

On the other hand, it is only necessary for the focussing error signal generating means to generate focussing error signals by the return light beam. Thus, the focussing error signal generating means may be constituted by a toric lens built on the surface of the optical member 33 and which has differential curvatures in two mutually orthogonal directions, or by a Foucault prism mounted on the surface of the optical member 33, instead of by the cylindrical lens 39. If the focussing error signal generating means is constituted by a Foucault prism, focussing error signals can be detected by the so-called Foucault method. The focussing error signal generating means may also be constituted by a hologram formed on the surface of the optical member 33.

The composite prism 34 includes a beam splitter 40, having a beam splitter film 40*a*, as a first separating film for separating the light beam, transmitted through the optical member 33 to proceed towards the optical disc 11 from the return light beam reflected back from the signal recording surface of the optical disc 11, a Wollaston prism 41, as polarization light splitting means for polarization-splitting the return light beam separated by the beam splitter film 40*a*, and a reflection prism 42 having a reflecting surface 42*a* for reflecting the return light beams, polarization-split by the Wollaston prism 41, these components 40 to 42 being bonded together as a unitary structure.

In the optical pickup 20, in which the beam splitter 40, having the beam splitter film 40*a*, as a first separating film, the Wollaston prism 41, as polarization light splitting means, and the reflection prism 42, having the reflecting surface 42*a*, are bonded as one to constitute a composite prism, the overall device size can be reduced, whilst the number of component parts can be further reduced to reduce the costs incurred in the components and in assembling further.

The beam splitter 40 is constituted as, for example, a partial polarization beam splitter. This partial polarization beam splitter 40 is made up of two triangular prisms bonded together with the respective inclined surfaces as abutting surfaces, with the beam splitter film 40*a* being arranged on the upper surface 33*a* of the optical member 33, carrying thereon the grating 38, so that the beam splitter film 40*a* will be inclined at an angle of approximately 45° relative to the substrate 37 arranged in the resin package 36.

This partial polarization beam splitter 40 has the function of transmitting part of the light beam proceeding towards the optical disc 11 to reflect part of the light beam proceeding towards the optical disc 11 to separate the light beam proceeding towards the optical disc 11 from the return light beam from the optical disc 11. However, it is also possible for the beam splitter 40 to produce the enhancement effect for the so-called Kerr rotation angle of increasing the rotational angle of the polarization plane of the return light beam by having respective different transmittance values of the incident light, depending on the direction of polarization of the incident light, by taking advantage of the multi-path interference effect of the beam splitter film 40*a*.

However, if the beam splitter 40 is constituted by the partial polarization beam splitter, it becomes possible to provide the Kerr rotation angle enhancement effect. However, the risk is high that the focussing servo be affected by double refraction on the optical disc 11. Thus, if particular importance is to be attached to focussing servo, it is effective to provide means for decreasing double refraction on the optical disc 11 or to construct the beam splitter 40 as a non-polarization splitting type beam splitter irrespective of the direction of polarization of the incident light.

The Wollaston prism 41 is comprised of two uniaxial crystals, such as artificial crystal, bonded together, and has the function of splitting the incident light into three light beams of different diffraction angles, namely p-, s- and p+s polarized light beams. This Wollaston prism 41 is arranged in the optical path of the return light beam on the upper surface 33*a* of the optical member 33 at back of the beam splitter 40.

The return beam, reflected back on the signal recording surface of the optical disc 11 and separated by the beam splitter film 40*a* of the beam splitter 40, is transmitted through the Wollaston prism 41 so as to be thereby split by the grating 38 in three beams in a direction substantially perpendicular to the splitting direction, thus into at least nine return light beams.

The optical pickup 20, having the Wollaston prism 41, as polarization splitting means, as described above, and polarization-splits the return light beam from the optical disc 11 to cause respective light beams to be received by different light receiving sections of the photodetector IC 35 to enable magneto-optical signals to be read out appropriately as playback signals.

The reflection prism 42 has a reflecting surface 42*a* for reflecting back the return light beams obtained on polarization splitting, and is provided at back of the Wollaston prism 41 on the optical path of the return light beam, above the upper surface 33*a* of the optical member 33 provided with the cylindrical lens 39, so that the reflecting surface 42*a* will run substantially parallel to the beam splitter film 40_a_ of the beam splitter 40, that is so that the reflecting surface 42_a_ will be substantially parallel to the beam splitter film 40_a_ of the beam splitter 40, or so that the reflecting surface 42_a_ will be inclined at an angle of approximately 45° relative to the substrate 37 arranged in the resin package 36.

The return light beam, polarization-split by the Wollaston prism 41, is reflected by the reflecting surface 42_a_ of the reflection prism 42 so that the optical path of the return light beam is warped by approximately 90°. The return light beam, reflected by the reflecting surface 42_a_ of the reflection prism 42, is transmitted through the optical member 33 via the second optical path L2 to get to the photodetector IC 35.

It is noted that the first optical path L1 of the light beam reflected back by the reflecting surface 32_a_ of the triangular prism 32 and transmitted through the optical member 33 to travel towards the composite prism 34 is substantially parallel to the second optical path L2 of the return light beam reflected back from the reflecting surface 42_a_ of the reflection prism 42 and transmitted through the optical member 33 to travel towards the photodetector IC 35.

In the optical pickup 20, in which the first optical path L1 of the light beam reflected back by the reflecting surface 32_a_ of the triangular prism 32 and transmitted through the optical member 33 to travel towards the composite prism 34 is substantially parallel to the second optical path L2 of the return light beam reflected back from the reflecting surface 42_a_ of the reflection prism 42 and transmitted through the optical member 33 to travel towards the photodetector IC 35, it becomes possible to arrange the semiconductor laser element 31 and the photodetector IC 35 at proximate positions to each other on the substrate 37 arranged in the resin package 36, whereby the overall device can be reduced further in size.

The photodetector IC 35 includes a photodetector portion for receiving a return light beam reflected back from the signal recording surface of the optical disc 11 and transmitted through the composite prism 34 and the optical member 33, and a voltage converting circuit for converting the current from the photodetector portion into voltage. The photodetector portion and the voltage converting circuit are combined into a sole integrated unit.

Figure 5:
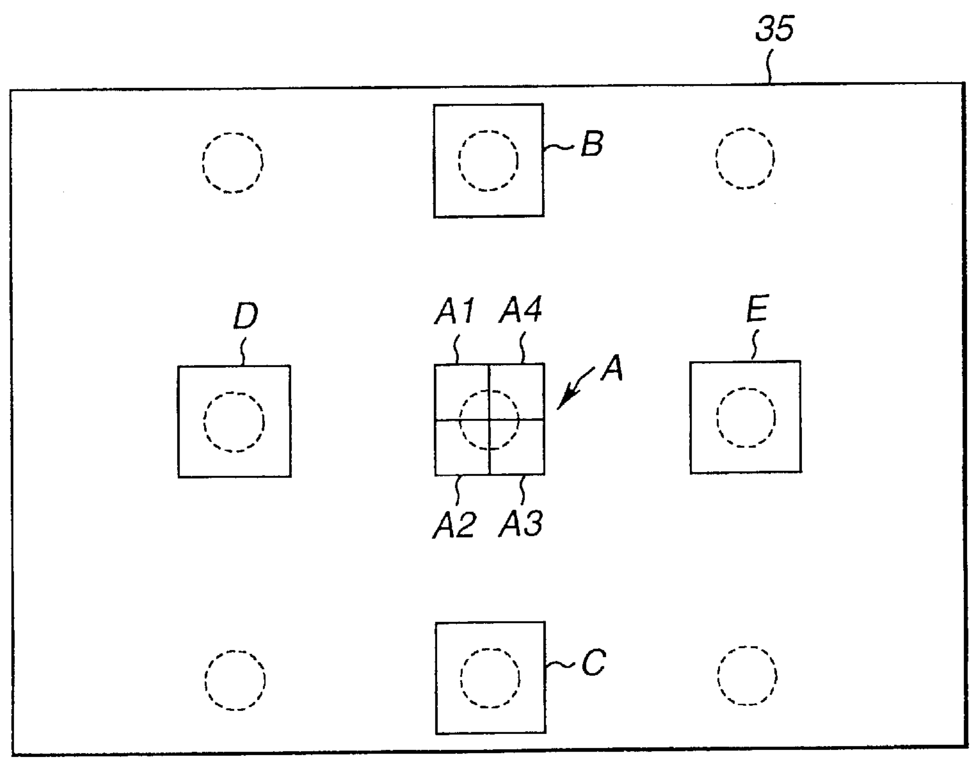
FIG. 5 is a schematic plan view of a photodetector IC provided in the integrated optical component.

The photodetector portion of the photodetector IC 35 includes five light receiving sections A to E, arranged in a direction along the radius of the optical disc 11 and in a direction perpendicular thereto, as shown in FIG. 5. Of these light receiving sections A to E, the center section A is further divided into four light receiving sections A1, A2, A3, A4 by two dividing lines which extend in vertical and horizontal directions to cross each other.

The photodetector portion is adapted to receive the return light beams, illuminated on the signal recording surface of the optical disc 11 in the split state by the grating 38, then reflected by the signal recording surface of the optical disc 11 and further polarization-split by the Wollaston prism 41, by the aforementioned light receiving sections. The current values corresponding to the light volume of the return light received by the respective light receiving sections of the photodetector portion are converted into voltage values by a voltage converting circuit so as to be sent as reception light signals to, for example, the signal demodulator 15 of the optical disc 10.

If light reception signals, corresponding to the light received by the light receiving sections Al, A2, A3, A4, B, C, D and E of the photodetector portion of the photodetector IC 35, are denoted SA1, SA2, SA3, SA4, SB, SC, SD and SE, respectively, the magneto-optical signal MO, pit reproducing signal Pit, focussing error signal FE and the tracking error signal TE may be found by the following calculating equation:

$$MO=SD-SE \quad (1)$$

$$Pit=SD+SE \quad (2)$$

$$FE=(SA1+SA3)-(SA2+SA4) \quad (3)$$

$$TE=SB-SC \quad (4)$$

In the integrated optical component 30, the respective components other than the objective lens 21 and the optical path raising mirror 22 are integrated into a sole integral unit. Thus, it suffices if the optical pickup 20 employing the present integrated optical component 30 is assembled as only the integrated optical component 30, objective lens 21 and the optical path raising mirror 22 are brought into registration with one another, thus simplifying the assembling operation and reducing the assembling cost.

The objective lens 21 is arranged facing the signal recording surface of the optical disc 11, which is run in rotation by the spindle motor 12, to converge the light beam from the integrated optical component 30 to illuminate the converged light beam on a recording track on the signal recording surface of the optical disc 11.

This objective lens 21 is supported for movement in two axial directions, that is in the focussing direction and in the tracking direction, by a bi-axial actuator, not shown. The objective lens 21 is moved in a direction along the radius of the optical disc 11 and in a direction towards and away from the signal recording surface of the optical disc 11, by the bi-axial actuator being driven responsive to the focussing error signals FE and the tracking error signals TE. This effectuates focussing servo for the light beam converged by the objective lens 21 to form a proper spot on the signal recording surface of the optical disc 11 and the tracking servo for the light beam spot to follow the desired recording track on the signal recording surface of the optical disc 11.

The optical path raising mirror 22 has an inclined surface (reflecting surface 22_a_) inclined at an angle of approximately 45° relative to the radiating direction of the light beam from the integrated optical component 30, and is arranged between the integrated optical component 30 and the objective lens 21. This optical path raising mirror 22 reflects the light beam radiated from the integrated optical component 30 on the reflecting surface 22_a_ thereof and warps the optical path by approximately 90° to guide the light to the objective lens 21.

In the optical pickup 20, the optical path raising mirror 22 is arranged between the integrated optical component 30 and the objective lens 21, and the optical path of the light beam from the integrated optical component 30 is warped by the optical path raising mirror 22 to guide it to the objective lens 21 to render the optical path of the light beam from the integrated optical component 30 to the optical path raising mirror 22 substantially parallel to the signal recording surface of the optical disc 11. Thus, it is possible to attempt to reduce the thickness of the optical disc 10 as the optical path length necessary for the light beam is kept.

The operation of reproducing recording signals recorded on the optical disc 11 is explained.

For reproducing the recording signals, recorded on the optical disc 11, the disc 11 is first loaded on the spindle motor 12. The spindle motor 12 is run in rotation at a pre-set rpm, under control by the optical disc controller 14, to run the optical disc 11 in rotation.

The head accessing controller 18 is driven, under control by the optical disc controller 14, to cause the movement of the optical pickup 20 to a pre-set recording position on the signal recording surface of the optical disc 11.

Also, in the optical pickup 20, a light beam is radiated from the semiconductor laser element 31 of the integrated optical component 30.

The light beam, radiated from the semiconductor laser element 31, is reflected by the reflecting surface 32*a* of the triangular prism 32 to fall via an opening 36*a* of the resin package 36 on the optical member 33. The light beam incident on the optical member 33 is transmitted through the optical member 33, on the first optical path L1, and is split by the grating 38, provided on the optical member 33, into plural light beams, including a main beam and two side beams, which then are incident on the beam splitter 40 of the composite prism 34.

The light beam, incident on the beam splitter 40, is partially transmitted through the beam splitter film 40*a* to exit the integrated optical component 30.

The light beam radiated from the integrated optical component 30 is reflected by the reflecting surface 22*a* of the optical path raising mirror 22 to fall on the objective lens 21. The light beam incident on the objective lens 21 is converged thereby to be illuminated on a pre-set recording track on the signal recording surface of the optical disc 11. At this time, three light spots are formed on the signal recording surface of the optical disc 11 by the main beam and two side beams, obtained on splitting by the grating 38.

When the light beam illuminated on a pre-set recording track on the signal recording surface of the optical disc 11 is reflected by this signal recording surface of the optical disc 11, it has its polarization plane rotated depending on the signal recording on the recording track, that is on the state of magnetization of the portion of the recording track illuminated with the light beam.

The return light beam, reflected by the signal recording surface of the optical disc 11, is again transmitted through the objective lens 21 so as to be then reflected by the reflecting surface 22*a* of the optical path raising mirror 22 to fall on the beam splitter 40 of the composite prism 34 of the integrated optical component 30.

The return light beam, incident on the beam splitter 40, is partially reflected by the beam splitter film 40*a* to fall on the Wollaston prism 41 of the composite prism 34. The return light beam, falling on the Wollaston prism 41, is polarization-split by this Wollaston prism 41 and is split by the grating 38 in a direction substantially perpendicular to the splitting direction and thereby split into at least nine return light beams.

The return light beam, polarization-split by the Wollaston prism 41, then falls on the reflection prism 42 of the composite prism 34 and is reflected by the reflecting surface 42*a* of the composite prism 34 to be re-incident on the optical member 33.

The return light incident on the optical member 33 is transmitted via the second optical path L2 through the optical member 33. At this time, the return light traverses the cylindrical lens 39 provided on the optical member 33 and thereby afforded with astigmatism.

The return light transmitted through the optical member 33 falls on the resin package 36 to get to the resin package 36 so as to be received by light receiving sections A1, A2, A3, A4, B, C, D and E of the photodetector IC 35. The return light, received by the photodetector IC 35, is photo-electrically converted by the photodetector IC 35 so as to be routed as light reception signal to the signal demodulator 15.

It is noted that magneto-optical (MO) signals or pit reproducing (Pit) signals, as playback signals, are generated by the signal demodulator 15, based on the light of the return light beams, received by the light receiving sections A1, A2, A3, A4, B, C, D and E of the photodetector IC 35, that is polarization-split by the by the Wollaston prism 41 and that is then received by the light receiving sections D and E.

On the other hand, focussing error (FE) signals are generated by the astigmatic method, based on the light of the return light beams which is received by the receiving sections A1, A2, A3, A4, B, C, D and E, split by the Wollaston prism 41, afforded with the astigmatism by the cylindrical lens 39 and which is received by the light receiving sections light receiving sections A1, A2, A3, A4.

Also, tracking error (TE) signals are generated by the signal demodulator 15 by the three-spot method, based on the light of the return light beams which is received by the receiving sections A1, A2, A3, A4, B, C, D and E, split by the grating 38 and which is received by the light receiving sections B and C.

The magneto-optical (MO) signals or the pit reproducing (Pit) signal, as playback signals, are corrected for errors by the error correction circuit 16 and thence routed to, for example, an external computer via an interface 17. Thus, the external computer etc is able to receive signals recorded on the optical disc 11 as playback signals.

On the other hand, the focussing error (FE) signals and the tracking error (TE) signals, generated by the signal demodulator 15, are routed to the servo controller 19 via the optical disc controller 14. The servo controller 19 drives the biaxial actuator, holding the objective lens 21 of the optical pickup 20, based on the focussing error (FE) signals and the tracking error (TE) signals, under control by the optical disc controller 14, to effectuate focussing servo and tracking servo operations.

SECOND EMBODIMENT

An optical pickup according to a second embodiment of the present invention is now explained. The optical pickup of the present second embodiment is similar to the optical pickup 20 of the first embodiment except that the optical components of the integrated optical component are slightly different from those of the first embodiment. Therefore, only the portions of the second embodiment similar to those of the first embodiment are depicted by the same reference numerals is not made and only the portions different from those of the first embodiment are explained.

Figure 6:
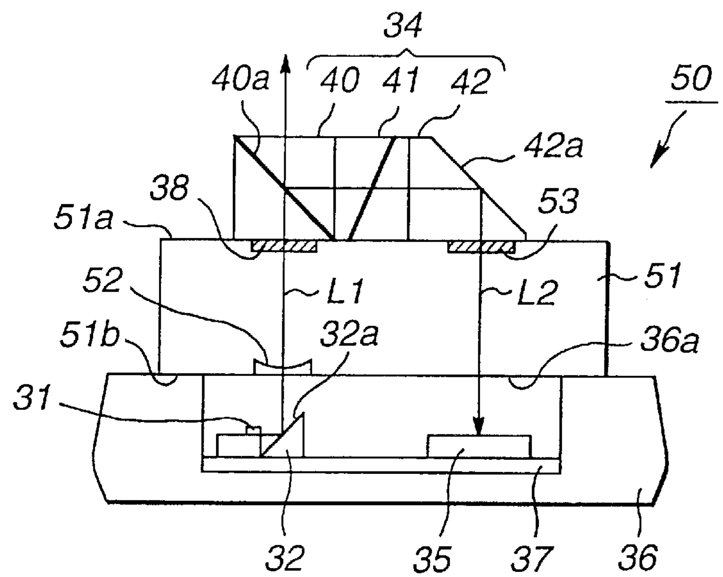
FIG. 6 is a schematic view showing another illustrative structure of an integrated optical component.

The optical pickup of the second embodiment is provided with an integrated optical component 50 shown in FIG. 6. The integrated optical component 50, shown in FIG. 6, is similar in structure to the integrated optical component 30 of the first embodiment except having an optical component 51 in place of the optical member 33 of the integrated optical component 30 of the first embodiment.

The optical component 51 is molded as a plan-parallel plate of a transparent plastics or glass material. The optical component 51 is formed as-one with a coupling lens 52, as light beam adjustment means, along with the grating 38, as light splitting means, lying on the first optical path L1.

The coupling lens 52 is used for varying the angle of divergence of the light beam radiated from the semiconductor laser element 31, and is mounted a convex lens on a portion of the lower surface 51*b* of the optical component 51 (surface of bonding to the resin package 36) that is transmitted through the light beam, that is on the first optical path L1.

By arranging the coupling lens 52, adapted for converting the angle of divergence of the light beam on the optical path L1, as the first light beam radiated from the semiconductor laser element 31, the optical pickup is able to guide the light, as the divergent light radiated from the semiconductor laser element 31, after the divergent light is throttled to some extent. Thus, by using the coupling lens 52, the optical pickup is able to use an objective lens of a finite multiplication factor, as the objective lens 21, as the light intensity of the laser light required for recording is kept. By using the objective lens of a finite multiplication factor, as the objective lens 21 in the optical pickup, it is possible to realize further size reduction, as well as to reduce the number of component parts, since there is no necessity of providing means for converting the divergent light into collimated light, such as a collimator lens.

Meanwhile, if the coupling lens 52 has the conversion multiplication factor ranging between 1 and 2.5, the light beam radiated from the semiconductor laser element 31 can be adjusted optimally and most efficiently so as to be guided to the objective lens 21.

Also, if the conversion multiplication factor of the coupling lens 52 is made to differ in the tangential and radial directions, this coupling lens 52 may be endowed with the function of correcting the astigmatism of the light beam radiated from the semiconductor laser element 31 so as to be illuminated on the signal recording surface of the optical disc 11. Thus, in this case, there is no necessity of providing an astigmatism correcting plate separately to reduce the number of component parts to reduce the cost incurred in the component parts or in assembling.

On the second optical path L2 of the optical component 51, there is formed a hologram 53, as focussing error signal generating means. As the cylindrical lens 39, formed as one with the optical member 33 provided on the integrated optical component 30 of the first embodiment, the hologram 53 affords astigmatism to the return light beam to enable detection of the focussing error signals by the astigmatic method. For example, the hologram is provided on the portion of the upper surface 51 a of the optical component 51 (surface bonded to the composite prism 34) through which is transmitted the return light beam, that is on the second optical path L2.

Similarly to the optical member 33 of the first embodiment, this optical component 51 is bonded with an adhesive to the resin package 36, housing the semiconductor laser element 31, triangular prism 32 or the photodetector IC 35 etc therein, and the composite prism 34 is bonded, such as with an adhesive, to the optical component 51, to constitute the integrated optical component 50. The integrated optical component 50 is secured and held on an optical base block supported for movement in a radial direction of the optical disc 11 along a guide shaft, not shown.

The optical pickup, having the above-described integrated optical component 50, exhibits the operation and result similar to those of the optical pickup 20 of the first embodiment. That is, in the present optical pickup, the coupling lens 52 as light beam adjusting means, the grating 38 as light splitting means and the hologram 53 as focussing error signal generating means, are formed as-one with the optical component 51, so that there is no necessity of separately providing the light splitting means, light beam adjustment means or the focussing error signal generating means as separate optical elements. Therefore, in the present optical pickup, the number of component parts and the overall size of the device are reduced in an amount corresponding to not providing the light beam adjustment means, light splitting means or the focussing error signal generating means as independent optical components. Also, in assembling the optical pickup, there is no necessity of respectively position setting the light beam adjustment means, light splitting means or focussing error signal generating means, so that it is possible to simplify the assembling operations.

Moreover, in the present optical pickup, similarly to the optical pickup 20 of the second embodiment, the respective components excluding the objective lens 21 and the optical path raising mirror 22 are integrated and constructed as a unitary optical component 50. Thus, it is only sufficient if the assembling operation be made as only the integrated optical component 50, objective lens 21 and the optical path raising mirror 22 are brought into registration, thereby simplifying the assembling operation and reducing the assembling cost.

THIRD EMBODIMENT

A third embodiment of the optical pickup embodying the present invention will be explained. In this third embodiment of the optical pickup, the basic structure is similar to that of the optical pickup 20 of the first embodiment, except that the optical member and the composite prism of the integrated optical component are configured differently from the first embodiment. Therefore, in the following description, parts or components which are the same as those of the first embodiment are depicted by the same reference symbols and are not explained specifically.

Figure 7:
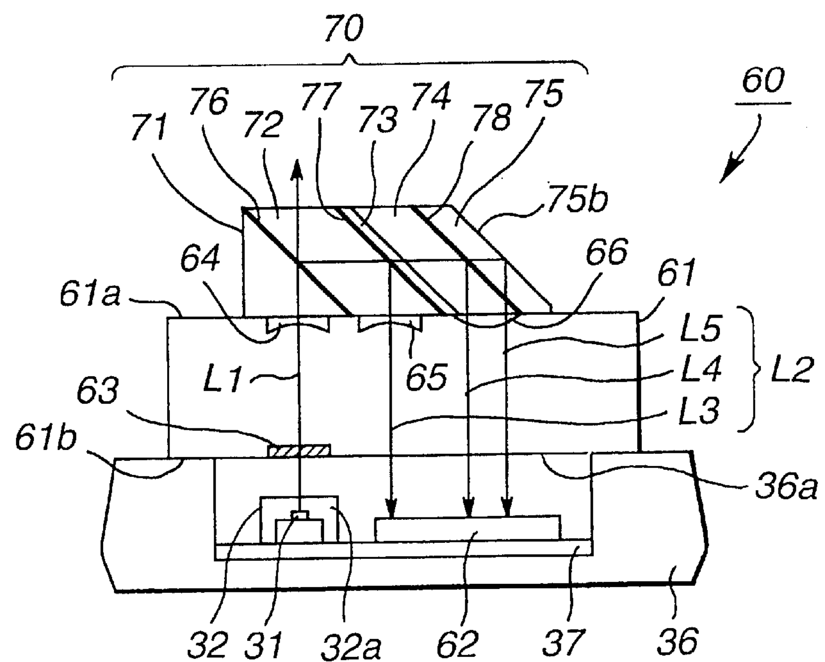
FIG. 7 is a schematic view showing still another illustrative structure of an integrated optical component.

The third embodiment of the perform includes an integrated optical component 60 shown in FIG. 7. The integrated optical component 60, shown in FIG. 7, includes an optical member 61, in place of the optical member 33 of the integrated optical component 30, while including a composite prism 70 in place of the composite prism 34 of the first embodiment. Also, the present integrated optical component 60 includes a photodetector IC 62 in place of the photodetector IC 35 of the integrated optical component 30 of the first embodiment. Also, in the integrated optical component 60, the optical member 61 is bonded to the resin package 36, such as with an adhesive, whilst the composite prism 70 is secured to the optical member 61 as with an adhesive to constitute a unitary element.

Figure 8:
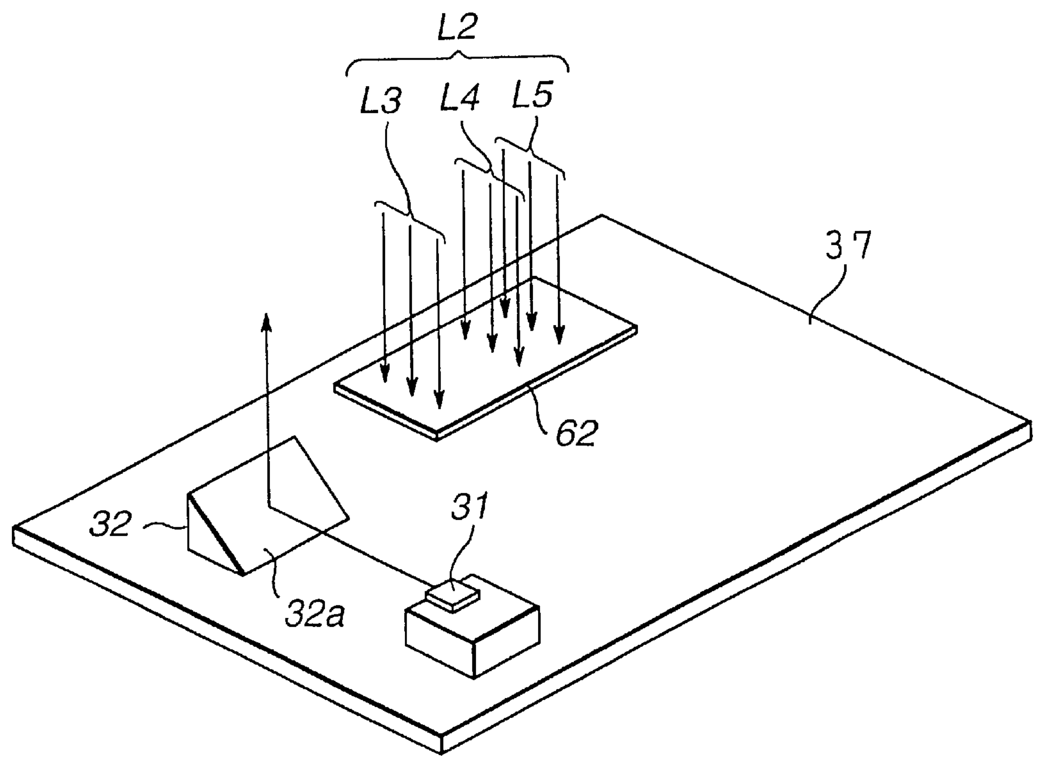
FIG. 8 illustrates the relative position between a semiconductor laser element, a triangular prism and a photodetector IC provided in the integrated optical component.

In the integrated optical component 60, although the semiconductor laser element 31, the triangular prism 32 and the photodetector IC 62 are provided on the substrate 37 arranged within the resin package 36 in a different arrangement from the integrated optical element 30 of the first embodiment, as shown in FIG. 8, the function of each element is the same as that in the first embodiment.

Figure 9:
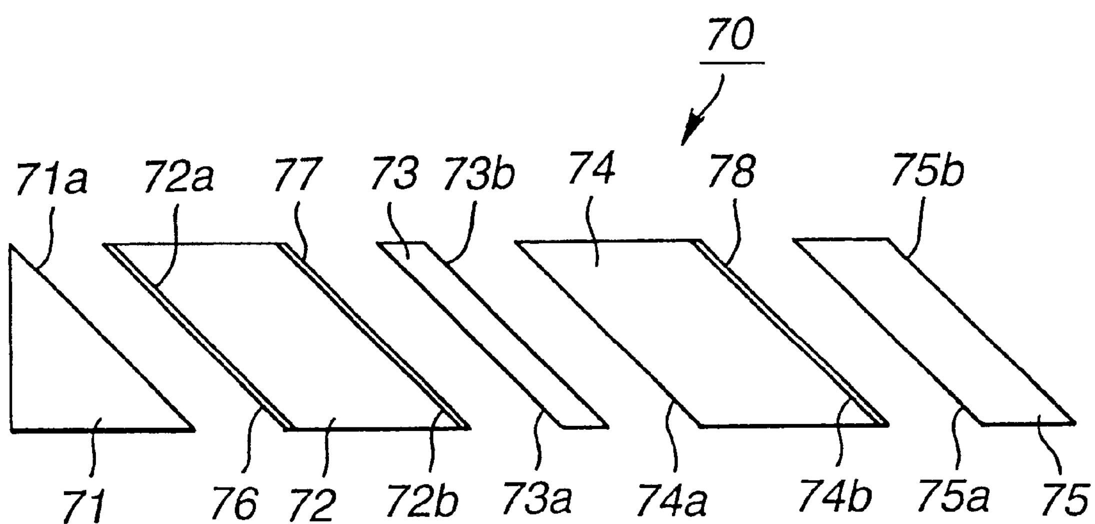
FIG. 9 is an exploded side view showing a composite prism provided in the integrated optical component.

The composite prism 70 has first to fifth members 71 to 75 bonded together, such as with an adhesive, as shown in FIG. 9, into a sole integral unit, which is bonded to the optical member 61.

The first member 71 is comprised of a triangular prism having an inclined surface 71*a*, which is inclined at an angle of approximately 45° relative to the substrate 37 arranged within the resin package 36. On the first member 71 is bonded a second member 72, such as with an adhesive, with the inclined surface 71*a* as a bonding surface.

The second member 72 is comprised of a triangular prism having a parallelopipedic cross-section and a pair of inclined surfaces 72*a*, 72*b* which are inclined at an angle of approximately 45° relative to the substrate 37 arranged within the resin package 36. On the inclined surfaces 72*a*, 72*b* of the second member 72 are formed a first beam splitter film 76 and a second beam splitter film 77, respectively. These first and second beam splitter films 76, 77 are both formed by dielectric multi-films. Similarly to the beam splitter 40 of the first embodiment, the first beam splitter 76 is constructed as a partial polarization type beam splitter, whilst the second beam splitter film 77 is formed as a non-polarization separation beam splitter.

Similarly to the beam splitter 40*a* of the first embodiment, the first beam splitter film 76 has the function of transmitting a portion of the light beam proceeding towards the optical disc 11 and reflecting part of the return light beam from the optical disc 11 to separate the light beam proceeding towards the optical disc 11 from the return light beam from the optical disc 11. Also, the first beam splitter film 76 is constructed as a partial polarization beam splitter and has differential transmittance depending on the direction of polarization of the incident light. Thus, the first beam splitter film 76 exhibits the effect of enhancing the Kerr rotation angle, that is the effect of increasing the rotational angle of the polarization plane of the return light beam.

The second beam splitter film 77 has the function of transmitting a portion of the return light beam, transmitted through the first beam splitter film 76 and which has traversed the second member 72, and of reflecting the remaining portion of the return light beam to separate the return light beam.

The second member 72, on the paired inclined surfaces 72*a*, 72*b* of which are provided the first and second beam splitter film 76, 77, is bonded to the first inclined surface 71*a* of the first member 71 via an adhesive, with the inclined surface 72*a* carrying the first beam splitter film 76 as a bonding surface for the first member 71. On the second member 72 is also bonded a third member 73, with an adhesive, with the other inclined surface 72*b*, carrying the second beam splitter film 77, as a bonding surface.

Figure 10:
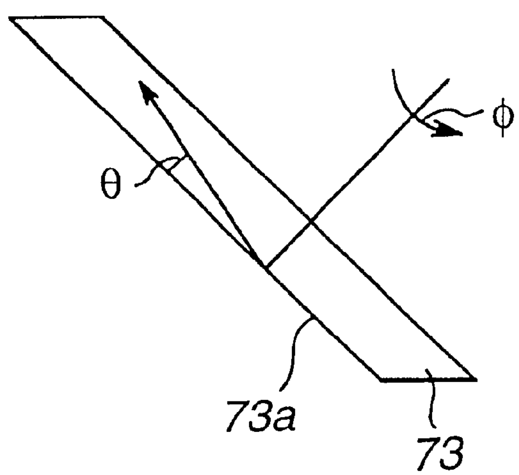
FIG. 10 illustrates the orientation of the optical axis of a third member (half-wave plate) of the composite prism.

The third member 73 is a half-wave plate of e.g., an artificial quartz, molded to have a parallelopipedic cross-section having a pair of inclined surfaces 73*a*, 73*b*, inclined at an angle of approximately 45° relative to the substrate 37, arranged in the resin package 36. The third member 73, constituted by the half-wave plate, preferably has its optical axis orientation so set that the in-plane rotational angle $\phi$ is approximately 20° and the angle between the inclined surface 73*a* and the optical axis is approximately 13.8°, as shown in FIG. 10. If the optical axis orientation of the third member 73 comprised of the half-wave plate is set so that the in-plane rotation $\phi$ is approximately 20° and the angle between the inclined surface 73*a* and the optical axis Will be approximately 13.8°, it is possible to correct the phase deviation ascribable to the differential refractive index caused by the difference in the positions of oblique incidence of the return light beam on the variable portions.

This third member 73, comprised of the half-wave plate, has the function of rotating the plane of polarization of the return light beam, reflected back from the signal recording surface of the optical disc 11 and transmitted through the first and beam splitter films 76, 77, by 45°.

The third member 73, constituted by the half-wave plate, is bonded to the inclined surface 72*b* of the second member 72, carrying the second beam splitter film 77, with an adhesive, with the inclined surface 73*a* thereof as the bonding surface to the second member 72. To the third member 73, formed by the half-wave plate, a fourth member 74 is bonded, with an adhesive, with the other inclined surface thereof as a bonding surface.

A fourth member 74 has a pair of inclined surfaces 74*a*, 74*b*, inclined at an angle of approximately 45° with respect to the substrate 37 arranged in the resin package 36, and is of a parallelopipedic cross-section. On the opposite side inclined surface 74*b* of the fourth member 74 is formed a polarization beam splitter film 78.

The polarization beam splitter film 78 is a multi-layer dielectric film and operates for completely separating the incident light, by its multi-path interference effect, depending on the direction of polarization. That is, the present polarization beam splitter film 78 is designed to transmit substantially 100% of the p-polarized light component, parallel to the incident plane, as well as to reflect substantially 100% of the s-polarized light component perpendicular to the incident surface.

On this polarization beam splitter film 78, the return light beam, which has its polarization plane rotated by 45° on transmission through the third member 73 formed by the half-wave plate, is incident via the fourth member 74. In the composite prism 70, magneto-optical (MO) signals are detected by the so-called 45° MO differential detection in which the return light beam, having its plane of polarization rotated by 45° by the third member 73, is caused to fall on the polarization beam splitter film 78 to effect separation on polarization.

The fourth member 74, on the inclined surface 74*b* of which the polarization beam splitter film 78 is formed, is bonded to the opposite side inclined surface 73*b* of the third member 73, with the opposite side inclined surface 74*a* as the bonding surface to the third member 73. To the fourth member 74 is bonded a fifth member 75, with an adhesive, with the inclined surface 74*b* of the fourth member 74, carrying the polarization beam splitter film 78, as a bonding surface.

The fifth member 75 is in the shape of a prism, having a parallelopipedic cross-section, with a pair of inclined surfaces 75*a*, 75*b* thereof being inclined by approximately 45° relative to the substrate 37 arranged in the resin package 36. The inclined surface 75*b* of the fifth member 75 operates as a reflecting surface for reflecting the return light beam transmitted through the polarization beam splitter film 78.

This fifth member 75 is bonded to the inclined surface 74*b* of the fourth member 74, carrying the polarization beam splitter film 78, with an adhesive, with the inclined surface 75*a* as a bonding surface with respect to the fourth member 74.

In the above-described composite prism 70, the first beam splitter film 76 formed on the inclined surface 72*a* of the second member 72 corresponds to the beam splitter film 40*a* in the composite prism 34 of the first embodiment and has the function of separating the light beam proceeding towards the optical disc 11 from the return light beam from the optical disc 1.

Also, in the present composite prism 70, constructed as described above, the second beam splitter film 77, formed on the second member 72, the third member 73, formed by a half-wave plate, and the polarization beam splitter film 78, formed on the inclined surface 74*b* of the fourth member 74, correspond to the Wollaston prism 41, in the composite prism 34 of the first embodiment, and has the function of polarization-separating the return light beam, separated by the beam splitter film 40*a*.

Moreover, with the present composite prism 70, the inclined surface 75*b* of the fifth member 75 corresponds to the reflecting surface 42*a* in the composite prism 34 of the first embodiment, and has the function of reflecting the return light transmitted through the polarization beam splitter film 78.

With the composite prism 70, comprised of the above-described component parts connected as a sole integral unit, it is possible to reduce the size of the optical pickup and the number of component parts to lower the cost incurred in assembling and in component parts, as in the first embodiment of the composite prism 34.

The above-described composite prism 70 is obtained on sequentially stacking plate-shaped first to fifth members 71 to 75 to give a layered product, and on slicing the layered product, followed by polishing, thus assuring facilitated manufacture.

Also, in this composite prism 70, in which the first beam splitter film 76 and the second beam splitter film 77 are formed on the inclined surfaces 72*a*, 72*b* of the second member 72, which is the sole member, it is possible to precisely control the distance between the first beam splitter film 76 and the second beam splitter film 77 without dependency on uncertain elements, such as adhesive thicknesses. Thus, with the optical pickup, employing the composite prism 70, the focussing error (FE) signals can be appropriately controlled as the optical path length of the light beam radiated from the semiconductor laser element 31 and transmitted through the first beam splitter film 76 is brought into correct coincidence with the optical path length of the return light reflected by the second beam splitter film 77 and by the second beam splitter film 77 so as to be received by the second beam splitter film 77.

The optical member 61 is molded to a plan-parallel plate from e.g., a transparent plastics or glass material. The optical member 61 is formed as-one with a grating 63 as light splitting means and a coupling lens 64 as light beam adjustment means. The grating 63 and the coupling lens 64 are arranged on the first optical path L1 for the light beam reflected by the triangular prism 32 to proceed towards the composite prism 70.

The optical member 61 is also formed as-one with a cylindrical lens 65, operating as focussing error signal generating means. The cylindrical lens 65 is positioned on an optical path portion of the second optical path L2, as the optical path of the return light beam separated from the composite prism 70 to proceed towards the photodetector IC 62 along which travels the return light beam reflected from the second beam splitter film 77 of the composite prism 70. This optical path portion is referred to below as a third optical path L3.

The optical member 61 also is formed as-one with a concave lens 66, operating as beam diameter adjustment means. This concave lens 66 is positioned on an optical path portion of the second optical path L2 along which travels the return light beam reflected back by the polarization beam splitter film 78 of the composite prism 70, referred to below as a fourth optical path L4, and on an optical path portion of the second optical path L2 along which travels the return light beam reflected back by the inclined surface 75*b* of the fourth member 75 of the composite prism 70, referred to below as a fifth optical path L5.

Similarly to the grating 38, formed as-one with the optical member 33 of the first embodiment, the grating 63 is a diffraction grating for diffracting the incident light, and is formed on a portion of a lower surface 61*b* of the optical member 61 (surface bonded to the resin package 36) traversed by the light beam, that is on the first optical path L1.

The coupling lens 64 is used for converting the angle of divergence of the light beam radiated from the semiconductor laser element 31, and is built as a convex lens on a portion of an upper surface 61*a* of the optical member 61 traversed by the light beam, that is on the first optical path L1.

With the optical pickup, in which the coupling lens 64 is arranged on the first optical path L1, along which travels the light beam radiated from the semiconductor laser element 31, the light beam, as the divergent light radiated from the semiconductor laser element 31, can be throttled to a certain extent and guided in this state to the objective lens 21. Thus, with the optical pickup, employing the coupling lens 64, an objective lens with a finite multiplication factor can be used as an objective lens 21, as the light intensity required for recording is maintained, thus enabling further size reduction. With the optical pickup, further reduction in size can be realized by employing an objective lens of a finite multiplication factor as the objective lens 21. On the other hand, means for collimating the divergent light, such as a collimator lens, may be dispensed with to reduce the number of component parts.

Similarly to the cylindrical lens 39, formed as-one with the optical member 33 of the first embodiment, the cylindrical lens 65 affords astigmatism to the incident light, while adjusting the optical path length. The cylindrical lens 65 is provided on a portion of the upper surface 61*a* of the optical member 61 traversed by the return light beam reflected back from the second beam splitter film 77, that is on the third optical path L3. For enabling detection of the focussing error signals by the so-called astigmatic method, the cylindrical lens 65 affords astigmatism to the return light beam reflected back from the second beam splitter film 77.

The concave lens 66 is used for adjusting the deviation between the optical path length of the return light beam reflected by the second beam splitter film 77 of the composite prism 70 and transmitted through the optical member 61 via the third optical path L3 so as to be received by the light receiving section of the photodetector IC 62, the optical path length of the return light beam reflected by the polarization beam splitter film 78 of the composite prism 70 and transmitted through the optical member 61 via the fourth optical path L4 so as to be received by the light receiving section of the photodetector IC 62, and the optical path length of the return light beam reflected by the inclined surface 75*b* of the fifth member 75 of the composite prism 70 and transmitted through the fifth optical path L5 via the fifth optical path L5 so as to be received by the light receiving section of the photodetector IC 62, to enable an optimum spot to be formed on the light receiving section of the photodetector IC 62.

This concave lens 66 is formed as-one with the upper surface 61 a of the optical member 61 for extending on a portion transmitted by the return light beam reflected by the polarization beam splitter film 78, that is on the fourth optical path L4, and on a portion transmitted by the return light beam reflected by the inclined surface 75*b* of the fifth member 75, that is on the fifth optical path L5.

The return light reflected by the polarization beam splitter film 78 of the composite prism 70 and the return light reflected by the inclined surface 75*b* of the fifth member 75 of the composite prism 70, are diffused by traversing the concave lens 66. This adjusts the optical path length of each return light beam received by the light receiving section of the photodetector IC 62, thus appropriately forming a spot of each return light beam on each light receiving section of the photodetector IC 62.

The photodetector IC 62 includes photodetector portions for receiving a return light beam, reflected by the second beam splitter film 77 of the composite prism 70, a return light beam transmitted through the second beam splitter film 77 and reflected back by the polarization beam splitter film 78, and a return light beam transmitted through the polarization beam splitter film 78 and reflected back by the inclined surface 75*a* of the fifth member 75, and a voltage conversion circuit for converting the current from the photodetector portions into voltage. The photodetector portions and the voltage conversion circuit are constructed as a sole integral unit.

Figure 11:
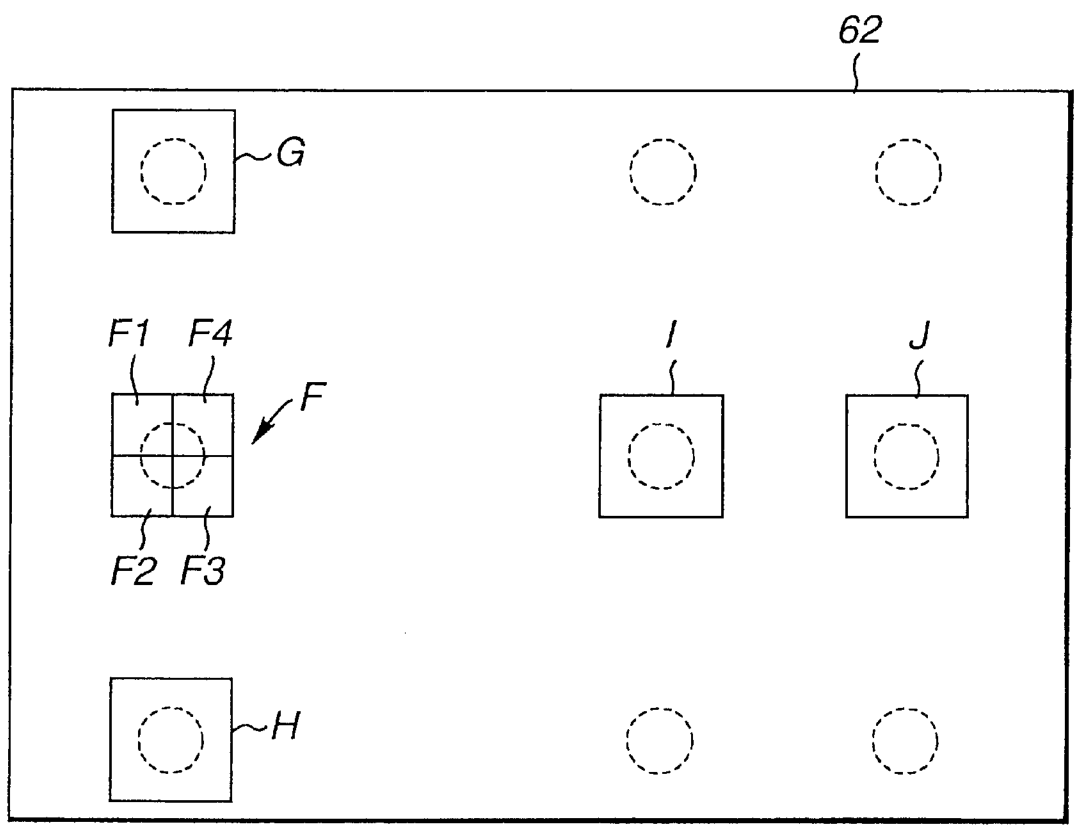
FIG. 11 is a schematic plan view showing a photodetector IC provided in the integrated optical component.

The photodetector portions of the photodetector IC 62 includes five light receiving sections F to J, as shown in FIG. 11. One F of the light receiving sections F to J is further split into four light receiving sections F1, F2, F3 and F4 by two splitting lines extending vertically and horizontally to cross each other.

The photodetector portions are designed to receive respective return light beams, illuminated on the signal recording surface of the optical disc 11, reflected back by the signal recording surface of the optical disc 11 and polarization-split by the composite prism 70. That is, the return light beam, which has reached the photodetector IC 62 via the third optical path L3, is received by the light receiving sections F, G and H of the photodetector portions, whilst the return light beam, which has reached the photodetector IC 62 through the fourth optical path L4, is received by the light receiving section I of the photodetector portions and the return light beam, which has reached the photodetector IC 62 through the fifth optical path L5, is received by the light receiving section J of the photodetector portions.

The current value derived from the light volume of the return light received by the light receiving sections of the photodetector portions is converted by the voltage conversion circuit into a voltage value and routed as light reception signals to the signal demodulator 15 of the optical disc device.

If the light reception signals, derived from the light received by the light receiving sections F1, F2, F3, F4, G, H, I and J of the photodetector portions of the photodetector IC 62 are denoted SF1, SF2, SF3, SF4, SG, SH, SI and SJ, the magneto-optical signal MO, pit reproducing signal Pit, focussing error signals FE and tracking error signals TE may be found by the following equations:

$$MO=SI-SJ \tag{5}$$

$$Pit=SI+SJ \tag{6}$$

$$FE=(SF1+SF3)-(SF2+SF4) \tag{7}$$

$$TE=SG-SH \tag{8}$$

The optical pickup, having the integrated optical component 60, as described above, has the operation and the meritorious effect similar to those of the first embodiment of the optical pickup 20. That is, in the present optical pickup, since the grating 63, as light splitting means, coupling lens 64, as light beam adjustment means, hologram 65, as focussing error signal generating means, and the concave lens 66, as focussing error signal generating means, are formed as-one with the optical component 61, it is unnecessary to provide these as separate optical components. Thus, in the present optical pickup, the number of components is reduced as compared to the case wherein these components are provided as independent optical components, thus reducing the size of the entire device. Moreover, when assembling the optical pickup, there is no necessity of separately setting the mounting positions of the light splitting means, focussing error signal generating means or beam diameter adjustment means, it is possible to simplify the assembling operations.

Also, in the present optical pickup, as in the first embodiment of the optical pickup 20, the components other than the objective lens 21 and the optical path raising mirror 22 are integrated to construct a unitary integrated optical component 60, so that, for assembling, it is only necessary that the integrated optical component 60, objective lens 21 and the optical path raising mirror 22 be brought into registration with one another, thus simplifying the assembling operation to reduce the assembling cost.

INDUSTRIAL APPLICABILITY

In the integrated optical component according to the present invention, in which the respective optical components are integrated and unified, whilst the focussing error signal generating means is unified to an optical component, thus realizing reduction in the size of the entire device and in the number of the components.

Also, in the integrated optical component according to the present invention, in which a light source and a photodetector are assembled integrally and provided on, for example, a sole substrate, it is possible to reduce the number of lead wires for signal lead-out to simplify the assembling operation and to reduce the assembling cost. In addition, the registration between the light source and the photodetector is also dispensed with.

In the optical pickup, the integrated optical component is made up of respective optical components integrated and unified together, whilst the focussing error signal generating means are assembled into an optical component, the overall size as well as the number of components may be reduced.

Moreover, in the optical pickup according to the present invention, in which a light source and a photodetector of the integrated optical component are assembled integrally and provided on, for example, a sole substrate, it is possible to reduce the number of lead wires for signal lead-out to simplify the assembling operation and to reduce the assembling cost. In addition, the registration between the light source and the photodetector is also dispensed with.

In the optical disc device according to the present invention, in which the integrated optical component is made up of respective optical components, integrated and unified together, whilst the focussing error signal generating means are assembled into an optical component, the optical pickup and the optical disc device can be reduced in size, while the number of component parts may also be reduced.

In addition, in the optical disc device according to the present invention, the light source and the photodetector of the integrated optical component are constructed as one and provided on, for example, a sole substrate, it is possible to reduce the number of lead wires for signal lead-out to simplify the assembling operation and to reduce the assembling cost. Moreover, the registration between the light source and the photodetector is also dispensed with.

What is claimed is:

1. An integrated optical component used for an optical pickup configured for illuminating a light beam on a signal recording surface of an optical disc to record and/or reproduce signals, comprising:

a light source for radiating a light beam for illuminating a signal recording surface of said optical disc;

a photodetector for receiving the return light beam reflected back from the signal recording surface of said optical disc for generating a servo signal;

a package member having an opening in one major surface thereof and configured for accommodating said light source and the photodetector therein;

an optical component provided on the major surface of the package member having said opening, said optical component being configured to transmit the light beam radiated from said light source therethrough and to transmit the return light beam proceeding towards said photodetector; and light separating means provided as-one with said optical component and configured for separating the light beam radiated from said light source from the return light beam proceeding towards said photodetector;

said optical component being formed as-one with focussing error signal generating means positioned on an optical path of the return light beam separated by said light separating means to proceed towards said photodetector, wherein, said light separating means including a first separating film for separating a light beam radiated from the light source from a return light beam proceeding towards said photodetector and a reflecting surface for reflecting the return light beam separated from said first separating film; and wherein a first optical path as an optical path for the light beam proceeding towards said first separating film and a second optical path as an optical path for the return light beam reflected back from said reflecting surface are substantially parallel to each other.

2. The integrated optical component according to claim 1 wherein said focussing error signal generating means is comprised of a cylindrical lens or a toric lens built on the surface of said optical component.

3. The integrated optical component according to claim 1 wherein said focussing error signal generating means is a Foucault lens built on the surface of said optical component.

4. The integrated optical component according to claim 1 wherein said focussing error signal generating means is a hologram formed on the surface of said optical component.

5. The integrated optical component according to claim 1 wherein a light splitting means is provided on said optical component on an optical path of a light beam proceeding from said light source towards said light separating means, said light splitting means being configured for splitting the light beam radiated from said light source into plural beams.

6. The integrated optical component according to claim 5 wherein said light splitting means is a diffraction grating for splitting the light beam radiated from said light source into at least three beams, that is a order zero light, (+) order one light and a (−) order one light.

7. The integrated optical component according to claim 1 wherein a reflecting member is provided in said package member for reflecting the light beam radiated from the light source for causing the reflected light beam to proceed towards said opening.

8. The integrated optical component according to claim 1 wherein said first separating film is a partial polarization-separating type separating film having differential transmittance depending on the direction of polarization of the incident light.

9. The integrated optical component according to claim 1 wherein said light separating means includes polarization separating means between said first separating film and the reflecting surface for polarization-separating the return light beam separated by said first separating film.

10. The integrated optical component according to claim 9 wherein said polarization splitting means is a Wollaston prism.

11. The integrated optical component according to claim 9 wherein said polarization splitting means is made up of a second separating film for further separating the return light beam separated from said first separating film, a half-wave plate arranged parallel to said second separating film, and a polarization separating film for polarization separating the return light beam transmitted through said half-wave plate.

12. The integrated optical component according to claim 11 wherein said second separating film is a non-polarization separating type having uniform reflectance without dependency on the direction of polarization of the incident light.

13. The integrated optical component according to claim 11 wherein said second separating film, half-wave plate and the polarization separating film are arranged as one integral unit.

14. The integrated optical component according to claim 11 wherein beam diameter adjustment means is provided on an optical path of the return light beam reflected back from said polarization separating film and on an optical path of the return light beam reflected back from the reflecting surface of said light separating means, said beam diameter adjustment means being configured for adjusting the beam diameters of said return light beams.

15. The integrated optical component according to claim 14 wherein beam diameter adjustment means is a concave lens built on the surface of said optical component.

16. The integrated optical component according to claim 9 wherein said first separating film, said polarization splitting means and a member having said reflecting surface are constructed as a sole integral unit.

17. The integrated optical component according to claim 1 wherein light beam adjusting means is formed as-one with said optical component, said light beam adjusting means being positioned in an optical path of a light beam radiated from said light source and proceeding towards said light splitting means, said light beam adjusting means being configured for converting the angle of divergence of the light beam radiated from said light source.

18. The integrated optical component according to claim 17 wherein light beam adjusting means is a convex lens built on the surface of said optical component.

19. The integrated optical component according to claim 17 wherein light beam adjusting means has a conversion multiplication factor ranging between 1 and 2.5.

20. The integrated optical component according to claim 17 wherein light beam adjusting means has a conversion multiplication factor for the tangential direction different from that of the radial direction.

21. An integrated optical component used for an optical pickup configured for illuminating a light beam on a signal recording surface of an optical disc to record and/or reproduce signals, comprising:

a light source for radiating a light beam for illuminating a signal recording surface of said optical disc;

a photodetector for receiving the return light beam reflected back from the signal recording surface of said optical disc for generating a servo signal;

a package member having an opening in one major surfaces thereof and configured for accommodating said light source and the photodetector therein;

an optical component provided on the major surface of the package member having said opening, said optical component being configured to transmit the light beam radiated from said light source therethrough and to transmit the return light beam proceeding towards said photodetector; and light separating means provided as-one with said optical component and configured for separating the light beam radiated from said light source from the return light beam proceeding towards said photodetector;

said optical component being formed as-one with focussing error signal generating means positioned on an optical path of the return light beam separated by said light separating means to proceed towards said photodetector, wherein a reflecting member is provided in said package member for reflecting the light beam radiated from the light source for causing the reflected light beam to proceed towards said opening.

22. An optical pickup for illuminating a light beam towards a signal recording surface of an optical disc for recording and/or reproducing signals, comprising:

an integrated optical component; and light converging means for converging the light beam for illuminating the converged light beam on the signal recording surface of said optical disc;

said integrated optical component including a light source for radiating a light beam for illuminating a signal recording surface of said optical disc;

a photodetector for receiving the return light beam reflected back from the signal recording surface of said optical disc for generating servo signal;

a package member having an opening in one major surface thereof and configured for accommodating said light source and the photodetector therein;

an optical component provided on the major surface of the package member having said opening, said optical component being configured to transmit the light beam radiated from said light source therethrough and to transmit the return light beam proceeding towards said photodetector therethrough; and light separating means provided as-one with said optical component and configured for separating the light beam radiated from said light source from the return light beam proceeding towards said photodetector;

said optical component being formed as-one with focussing error signal generating means positioned on an optical path of the return light beam separated by said light separating means to proceed towards said photodetector, wherein, said light separating means including a first separating film for separating a light beam radiated from the light source from a return light beam proceeding towards said photodetector and a reflecting surface for reflecting the return light beam separated from said first separating film; and wherein a first optical path as an optical path for the light beam proceeding towards said first separating film and a second optical path as an optical path for the return light beam reflected back from said reflecting surface are substantially parallel to each other.

23. The optical pickup according to claim 22 wherein, between said integrated optical component and the light converging means, there is provided a reflecting member for reflecting the light beam from said integrated optical component to cause the reflected light beam to proceed towards said light converging means, said reflecting member reflecting the return light transmitted through said light converging means to cause the reflected light to proceed towards said integrated optical component.

24. An optical disc device comprising:

an optical pickup for illuminating a light beam on a signal recording surface of an optical disc to detect the return light from a signal recording surface of said optical disc;

a biaxial actuator for supporting the light converging means provided on said optical pickup for movement in bi-axial directions;

a signal processing circuit for generating playback signals based on a detection signal from a photodetector provided on said optical pickup; and servo means for causing movement in the bi-axial directions of said light converging means provided in said optical pickup based on a detection signal from the photodetector provided on said optical pickup;

said optical pickup including a light source for radiating a light beam for illuminating a signal recording surface of said optical disc;

a photodetector for receiving the return light beam reflected back from the signal recording surface of said optical disc for generating a servo signal;

a package member having an opening in one major surface thereof and configured for accommodating said light source and the photodetector therein;

an optical component provided on the major surface of the package member having said opening, said optical component being configured to transmit the light beam radiated from said light source therethrough and to transmit the return light beam proceeding towards said photodetector; and light separating means provided as-one with said optical component and configured for separating the light beam radiated from said light source from the return light beam proceeding towards said photodetector;

said optical component being formed as-one with focussing error signal generating means positioned on an optical path of the return light beam separated by said light separating means to proceed towards said photodetector, wherein, said light separating means including a first separating film for separating a light beam radiated from the light source from a return light beam proceeding towards said photodetector and a reflecting surface for reflecting the return light beam separated from said first separating film; and wherein a first optical path as an optical path for the light beam proceeding towards said first separating film and a second optical path as an optical path for the return light beam reflected back from said reflecting surface are substantially parallel to each other.

25. An integrated optical component used for an optical pickup configured for illuminating a light beam on a signal recording surface of an optical disc to record and/or reproduce signals, comprising:

a light source for radiating a light beam for illuminating a signal recording surface of said optical disc;

a photodetector for receiving the return light beam reflected back from the signal recording surface of said optical disc for generating a servo signal;

a package member having an opening in one major surfaces thereof and configured for accommodating said light source and the photodetector therein;

an optical component provided on the major surface of the package member having said opening, said optical component being configured to transmit the light beam radiated from said light source therethrough and to transmit the return light beam proceeding towards said photodetector; and light separating means provided as-one with said optical component and configured for separating the light beam radiated from said light source from the return light beam proceeding towards said photodetector;

said optical component being formed as-one with focussing error signal generating means positioned on an optical path of the return light beam separated by said light separating means to proceed towards said photodetector, wherein there is provided light splitting means on said optical component on an optical path of a light beam proceeding from said light source towards said light separating means, said light splitting means being configured for splitting the light beam radiated from said light source into plural beams.

26. The integrated optical component according to claim 25 wherein said light splitting means is a diffraction grating for splitting the light beam radiated from said light source into at least three beams, that is a order zero light, (+) order one light and a (−) order one light.

27. An optical pickup for illuminating a light beam towards a signal recording surface of an optical disc for recording and/or reproducing signals, comprising:

an integrated optical component; and light converging means for converging the light beam for illuminating the converged light beam on the signal recording surface of said optical disc;

said integrated optical component including a light source for radiating a light beam for illuminating a signal recording surface of said optical disc;

a photodetector for receiving the return light beam reflected back from the signal recording surface of said optical disc for generating a servo signal;

a package member having an opening in one major surfaces thereof and configured for accommodating said light source and the photodetector therein;

an optical component provided on the major surface of the package member having said opening, said optical component being configured to transmit the light beam radiated from said light source therethrough and to transmit the return light beam proceeding towards said photodetector therethrough; and light separating means provided as-one with said optical component and configured for separating the light beam radiated from said light source from the return light beam proceeding towards said photodetector;

said optical component being formed as-one with focussing error signal generating means positioned on an optical path of the return light beam separated by said light separating means to proceed towards said photodetector, wherein between said integrated optical component and the light converging means, there is provided a reflecting member for reflecting the light beam from said integrated optical component to cause the reflected light beam to proceed towards said light converging means, said reflecting member reflecting the return light transmitted through said light converging means to cause the reflected light to proceed towards said integrated optical component.

* * * * *